United States Patent [19]

Gött et al.

[11] Patent Number: 4,468,550
[45] Date of Patent: Aug. 28, 1984

[54] MULTISPOTWELDING MACHINE FOR THE PRODUCTION OF GRIDS OR GRATINGS

[75] Inventors: Hans Gött; Rudolf Scherr; Josef Ritter; Klaus Ritter; Gerhard Ritter, all of Graz, Austria

[73] Assignee: EVG Entwicklungs-und Verwertungs-Gesellschaft mbH., Graz, Austria

[21] Appl. No.: 397,826

[22] Filed: Jul. 13, 1982

[30] Foreign Application Priority Data

Jul. 28, 1981 [AT] Austria .................................. 3328/81

[51] Int. Cl.³ .......................................... B23K 11/00
[52] U.S. Cl. .......................................... 219/56; 219/87
[58] Field of Search ....................... 219/56, 58, 87, 88; 228/4.1

[56] References Cited

U.S. PATENT DOCUMENTS

| 3,497,659 | 2/1970 | Ritter et al. | 219/56 |
| 3,692,970 | 9/1972 | Gött el al. | 219/87 X |
| 4,125,753 | 11/1978 | Ritter et al. | 219/56 |
| 4,360,724 | 11/1982 | Ritter et al. | 219/56 |

FOREIGN PATENT DOCUMENTS 252692 3/1967 Austria .
267292 12/1968 Austria .

Primary Examiner—Roy N. Envall, Jr.
Assistant Examiner—Catherine M. Sigda
Attorney, Agent, or Firm—Ernest F. Marmorek

[57] ABSTRACT

This multispotwelding machine serving for the production of grids or gratings has a welding electrode system (50, 51, 52) suitable for double spotwelding in the direction of the longitudinal members (L) and having two lines of weld (S1, S2), two crosswire feed lines (E1, E2) arranged in a fixed position at a distance apart (A), two crosswire transfer tools (4, 5) which are arranged on a common bearer (1), which can be shifted in the direction of the grid feed by a length of stroke (H) corresponding with the distance of the plane of symmetry (ME) of the feed lines from the plane of symmetry (MS) of the lines of weld (S1, S2) of the welding electrode system, as well as a grid feed mechanism (67). For enabling alteration of the crosswire pitches a mechanism (2, 3, 21, 23) is provided by which the crosswire transfer tools (4, 5) can, during the motion of the transfer tools, be adjusted on the common bearer (1) in opposite senses by equal amounts (x) in the direction of the longitudinal members (L), so that their lengths of stroke (H±x) are altered in opposite senses with respect to the length of stroke (H) of the bearer (1).

12 Claims, 12 Drawing Figures

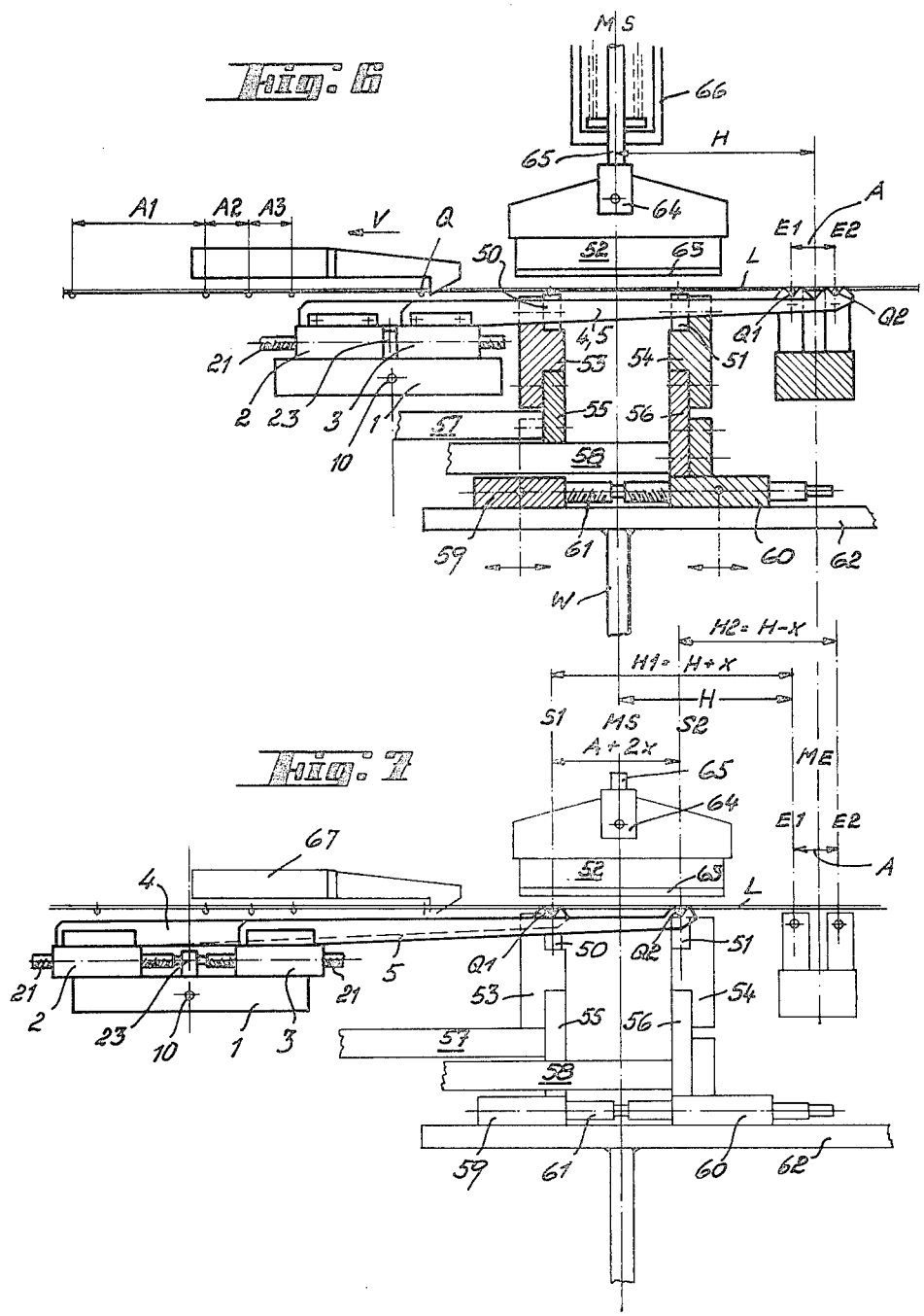

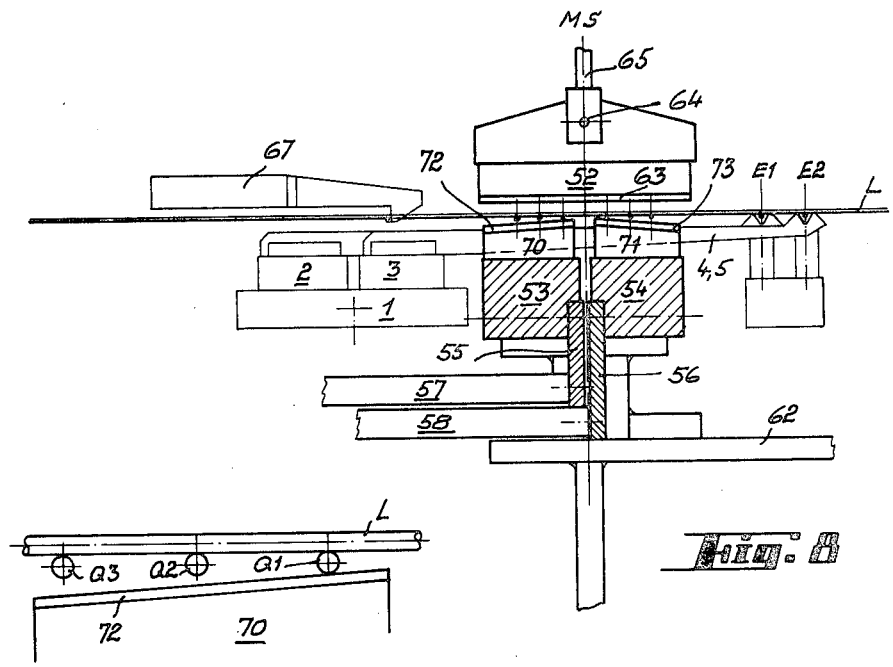
Fig. 8
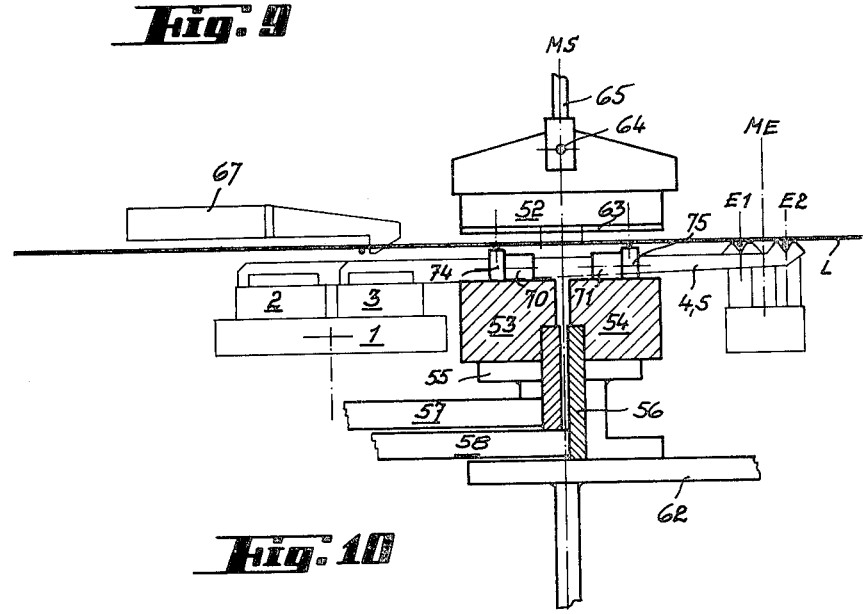
Fig. 9
Fig. 10

MULTISPOTWELDING MACHINE FOR THE PRODUCTION OF GRIDS OR GRATINGS

The invention relates to a multispotwelding machine for the production of grids or gratings of longitudinal members and crosswires crossing the longitudinal members, the machine having a welding electrode system suitable for making double spotwelds at two longitudinally spaced lines of weld where two crosswires cross the longitudinal members, two wire-guides arranged at a fixed distance apart on feed lines for the simultaneous feeding in of two crosswires, crosswire transfer tools arranged on a common bearer which can be shifted by a stroke corresponding with the distance of the plane of symmetry midway between the feed lines from the plane of symmetry midway between the lines of weld of the welding electrode system and means for the forward feed of the grid or grating after each welding operation. Such a machine is hereinafter referred to as of the kind described.

In the case of normal grids the longitudinal members are also wires and are welded to the crosswires at the crossover points. In the case of gratings the longitudinal members consist, on the contrary, of flat steel strips standing on edge, into which the crosswires are usually welded to such a depth that they come to lie flush with the top edges of the strips.

In the case of one known grid-welding machine of the kind described (cf Austrian Patent Specification No. B-267.292) the crosswire transfer tools which advance the crosswires from the feed lines to the lines of weld are made as transport-arms which are mounted rigidly on the shiftable bearer and project from it in the same direction and which have notches for picking up two crosswires, at a fixed spacing corresponding with a predetermined pitch of the crosswires and with the equally fixed distance apart of the crosswire feed lines. Again, on the transport-arms in front of these notches in the direction of forward feed of the grid, hooks are provided which seize crosswires already welded to the longitudinal members of the grid and by means of these crosswires move the grid onwards at each transfer motion of the transport-arms. The welding electrode system in that case carries out double spotwelds during which the points of cross formed by one longitudinal member and the two crosswires lie every time in series in a welding stretch running between two electrodes.

As compared with other known grid-welding machines in which in each welding stretch each time only one single crosswire gets welded onto one longitudinal member, the above-described machines working with double spotwelds have the advantage of doubled productivity, whilst the consumption of energy for the simultaneous welding-on of two crosswires per welding stretch is not essentially higher than that for the welding-on of only one single crosswire in each welding stretch. A further advantage consists in the fact that no warping of the grid occurs because all of the points of weld along one and the same crosswire lie at the same voltage so that in the crosswires no currents can flow to heat up these wires, which might cause warping of the grid.

A deficiency in the known grid welding machine of the kind described, working with double spotwelding, lies in the fact that it is purely a single-purpose machine which is only capable of producing grids of gratings having one single unalterably predetermined pitch of the crosswires equal to the distance apart of the crosswire feed lines, whereas the machines working with single spotwelds, in which in each welding stretch only one single crosswire gets welded on to one longitudinal member, are capable of producing grids or gratings having completely optional crosswire pitches which if necessary can be altered even during operation of the machine.

From the Austrian Patent Specification No. B-252.692, a straightline guide mechanism is known, which is suitable in particular for crosswire transfer tools in grid welding machines and consists essentially of supporting and swinging levers connected by hinges and coupled together frictionally into mutual oscillating motion. Two such straightline guide mechanisms may in known manner be made and coupled together and controlled in such a way that the swinging levers advance two crosswires at a time from feed lines arranged at a predetermined distance apart, to lines of weld of a welding electrode system, arranged at a different distance apart. But for the alteration of the pitches of the crosswires it is in that case necessary to alter the angle of swing of the supporting levers separately and to a different extent, which is difficult and demands relatively complicated adjusting devices, in particular when the alteration of the crosswire pitches is to be effected during the cyclic working motion of the crosswire transfer tools.

The object of the invention is to develop further a multispotwelding machine of the kind described in such a way that, in a way which is structurally simple and reliable in operation, grids or gratings may be produced, having any crosswire pitches which may if necessary be altered during the production process, so that the machine unites the advantages of the known machine having double spotwelding with the advantages of the known machines having single spotwelding.

In accordance with the invention, a machine of the kind described is characterized in that the spacing of the lines of weld is variable, there are two of the crosswire transfer tools each for transferring a crosswire from a respective one of the feed lines to a corresponding one of the lines of weld, and means are provided for shifting the tools on the bearer in opposite senses so the strokes of the tools are greater and smaller by equal amounts than that of the bearer.

As is explained below in greater detail, such a machine if it is set at the same length of stroke of both transfer tools, produces grids having constant crosswire pitches which correspond with the distance apart of the crosswire feed lines. But by alteration of the length of stroke of the two transfer tools in opposite senses the crosswire pitches may be increased or reduced before or even during the production of a grid.

The invention is now explained in greater detail with reference to the accompanying drawings in which:

FIG. 6 shows the electrode system and the transfer tool system at the instant of takeover of the crosswires from the feed lines;

FIG. 7 shows the electrode system and the transfer tool system with the crosswires arranged on the lines of weld;

FIG. 8 shows a second embodiment of the electrode system;

FIG. 9 is a detail from FIG. 8;

FIG. 10 shows a third embodiment of the electrode system;

Figure 1:
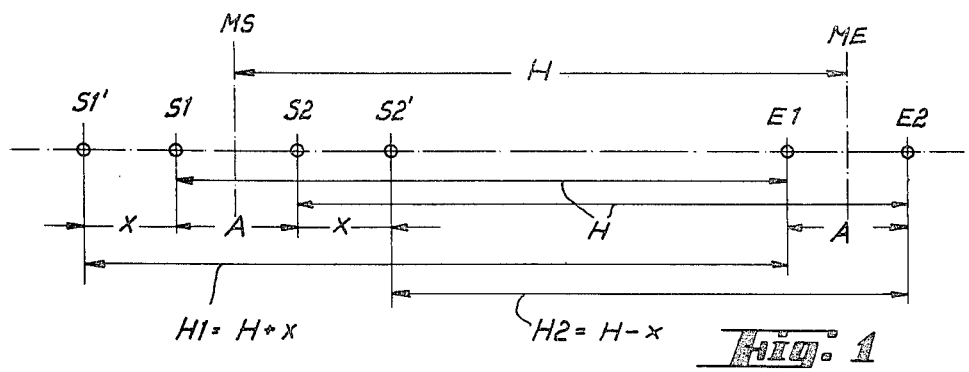
FIG. 1 is a diagram of the cycles of motion of the two crosswire transfer tools.

In FIG. 1, for the explanation of the fundamental concept of the invention, different relative positions of the lines of weld with respect to the crosswire feed or "shoot" lines are shown, seen in the direction of these lines, i.e., corresponding with a side elevation of the welding machine. The two feed lines E1 and E2 are, as usual, fixed in position whereas the associated lines of weld are alterable in position for the alteration of the pitches of the crosswires. If the crosswires which at any time have been fed into the welding machine simultaneously along the two feed lines E1 and E2 get shifted towards the welding electrode system by the associated transfer tools by the distance apart H of the planes of symmetry ME and MS of the feed lines and the lines of weld respectively, they arrive at the lines of weld S1 and S2 respectively, which have the same distance apart A as the feed lines E1 and E2. In the case of an alteration in the lengths of the strokes H1 and H2 of the crosswires in opposite senses by the value x (H1=H+x, H2=H−x) there result the lines of weld S1' and S2', the distance apart of which is greater by 2x than the distance A between the feed lines. By reduction of the length of stroke H1 and corresponding increase in the length of stroke H2, lines of weld may also be obtained, the distance apart of which is less than the distance A between the feed lines. If the alteration of the lengths of stroke H1 and H2 of the two transfer tools in opposite senses is effected within a working cycle of the welding machine as is possible in the case of the embodiments of the invention described below, the crosswire pitches may be altered during the production of the grid.

As may be understood from FIGS. 2 and 3, in the case of one embodiment of the invention, a bearer beam 1 upon which, in a manner which is to be described later in greater detail, two guide beams 2 and 3 are arranged so as to be able to shift in opposite senses for transport arms 4 and 5 serving as crosswire transfer tools, is connected by hinges to a first link quadrilateral 6. The link quadrilateral 6 is connected by a hinge 7 to a second link quadrilateral 15. Furthermore the link quadrilateral 6 is hinged to a swinging arm 9 supported so as to be able to swing in a bearing 8 fixed to the machine. This swinging arm may, by driving means which are known and therefore not shown, such as pistons or cranks, be moved to and fro between the two limiting positions shown in FIGS. 2 and 3, whereupon the centre of gravity 10 of the bearer beam 1 covers the travel H between its two extreme positions.

The second link quadrilateral 15 of which one corner is supported by a hinge in a bearing 16 fixed in the machine, carries a cam follower roller 17 which by means which are not shown, being well known, for example a spring, is pressed against the periphery of a likewise not shown control cam. The link 18 of the link quadrilateral 15, lying opposite the link carrying the follower roller 17, is connected rigidly to one link 19 of the link quadrilateral 6, so that any motion of the cam follower roller 17 gets transmitted to the link quadrilateral 6 via the hinge 7 and the links 18 and 19 which are connected rigidly together to form a bell crank.

Figure 2:
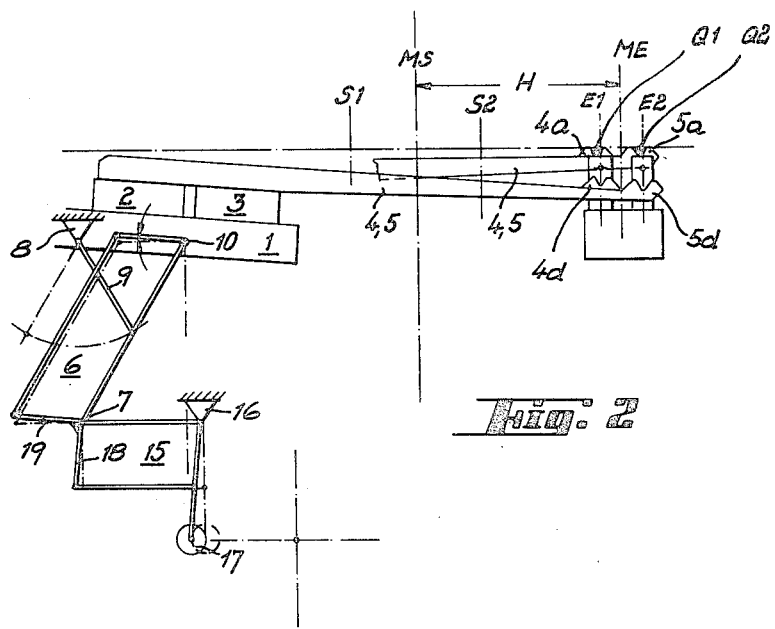
FIGS. 2 and 3 show the kinematics of the drive of the transfer tool system in two different phases of operation.
Figure 3:
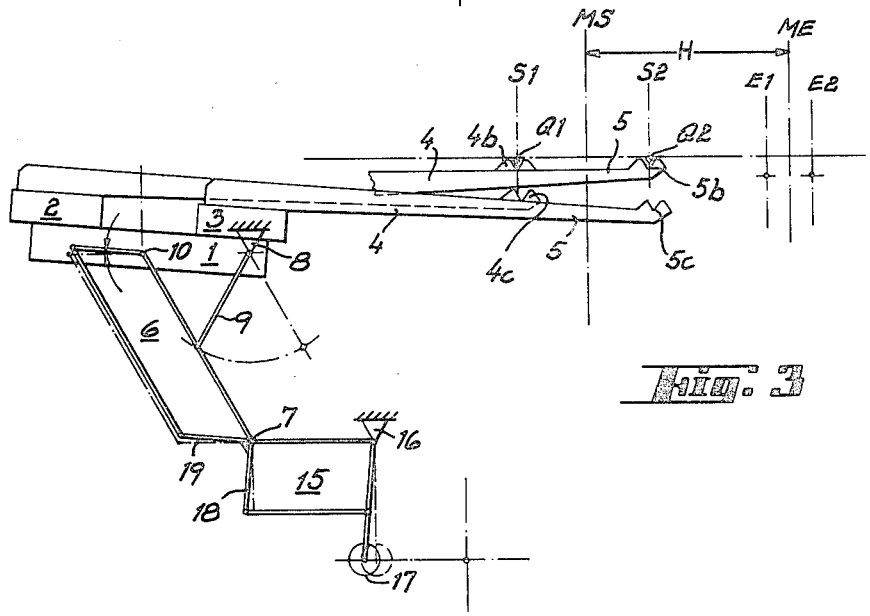

From a comparison of FIGS. 2 and 3 the cycle of motion during the transfer of the crosswires may be understood. In FIG. 2 the transport arms 4, 5 with their notches lying in the positions 4a and 5a but not shown as a whole, have just lifted the crosswires Q1 and Q2 respectively out of wire guides at E1 and E2. The swinging arm 9 now moves under the action of its drive out of the position shown in FIG. 2 into the position as FIG. 3. In doing so the transport arms 4, 5 proceed with their notches out of the positions 4a, 5a in FIG. 2 into the positions 4b, 5b in FIG. 3, their movement in doing which, by the amount x in opposite senses, will have to be explained in greater detail later.

As soon as the transport arms 4, 5 have arrived with their notches in the positions 4b, 5b, the cam follower roller 17 gets shifted by the control cam out of the position shown in dash-dot line in FIG. 3 into the position shown in solid line in FIG. 3, whereupon the two link quadrilaterals 6 and 15 get tilted in such a way that the individual links move out of the positions shown in dash-dot line in FIG. 3 into the positions shown there likewise in solid line. The bearer beam 1 thereby gets tilted about its centre of gravity 10 and the transport arms adopt with their notches the positions designated in FIG. 3 by 4c and 5c. The crosswires Q1 and Q2 thereby get laid upon the lower electrodes 50, 51 which may be seen in FIGS. 6 and 7 and are explained later, whereupon the transport arms 4, 5 come out of engagement with the crosswires.

The swinging arm 9 now returns into the position shown in FIG. 2, and thus the transport arms 4, 5 arrive with their notches in the positions designated there by 4d and 5d, so that during the whole return motion they lie underneath the longitudinal members and the crosswires, that is, also out of engagement with the latter.

Now the cam follower roller 17 returns into the position shown in dash-dot line in FIG. 2 and the axes of the links forming the two link quadrilaterals 6 and 15 move back out of the position shown in solid line into the position shown in dash-dot line. The transport arms in doing so, swing back out of the positions designated by 4d and 5d into the positions designated in FIG. 2 by 4a and 5a and during this motion lift two new crosswires Q1, Q2 out of the wire guides at E1, E2 and prepare them for a new feed step.

Figure 4:
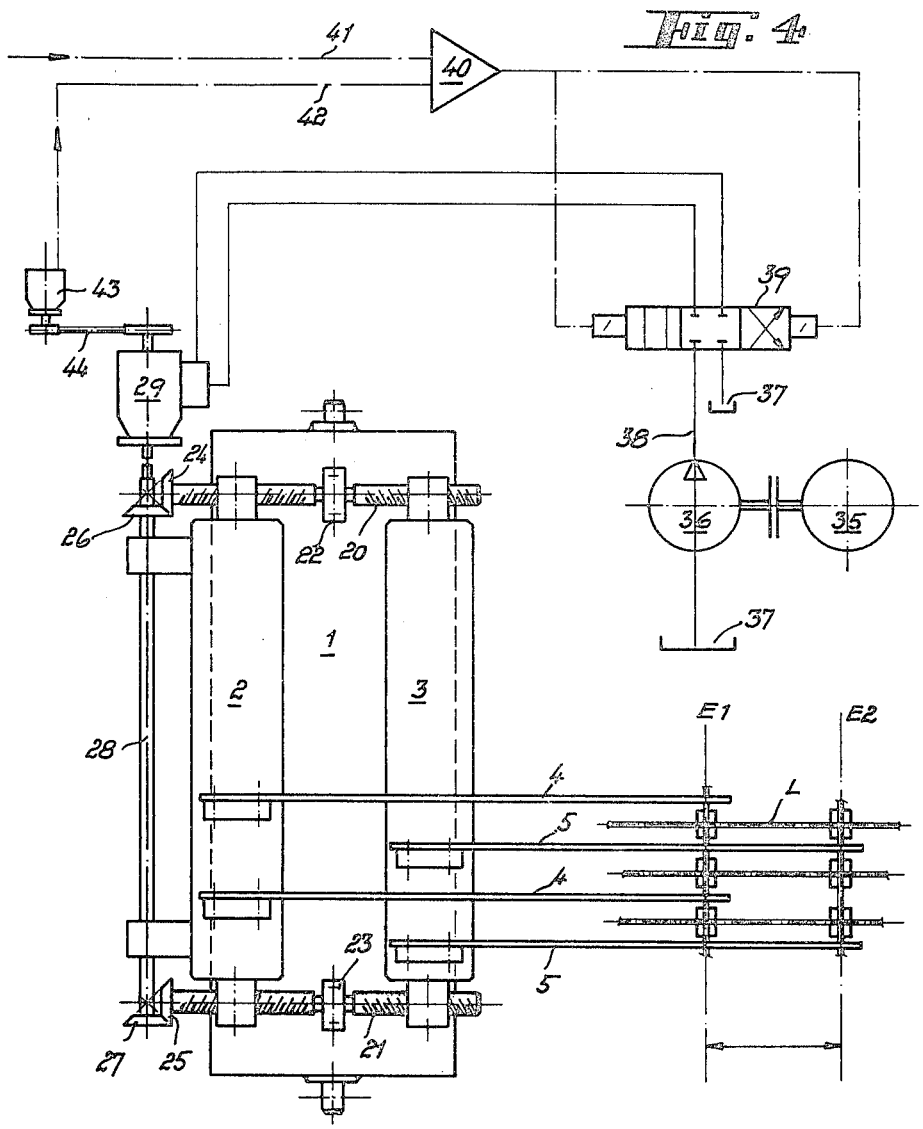
FIG. 4 is a plan of the transfer tool system together with a diagram of the hydraulic control.
Figure 5:
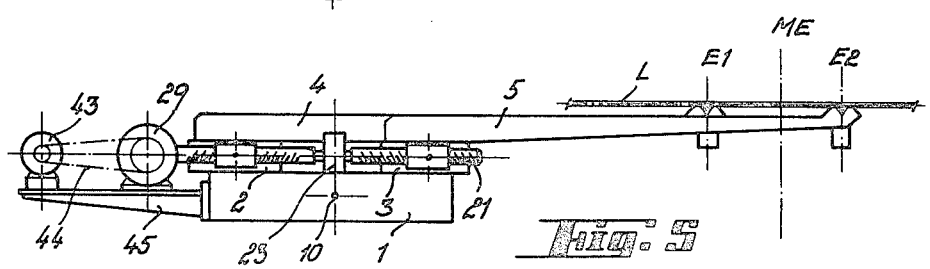
FIG. 5 is a side elevation corresponding to FIG. 4.

The ends of the two guide beams 2, 3 are in accordance with FIGS. 4 and 5 traversed by two spindles 20, 21 which are supported in bearings 22, 23 which are fastened immovably to the bearer beam 1, and are cut into threads which are opposed on opposite sides of the bearings 22, 23. One end each of the spindles 20, 21 is connected fixedly in rotation to a bevel gear 24 and 25 respectively, which engages with a further bevel gear 26 and 27 respectively.

The two bevel gears 26, 27 are seated fixedly in rotation upon a common shaft 28 which in turn can be driven by a hydraulic motor 29. A pump 36 driven by a motor 35 draws oil out of an oil sump 37 and passes it into a feed pipe 38 in which is inserted an electrohydraulic valve 39. This electrohydraulic valve 39 is under the controlling action of a servo-amplifier 40.

The servo-amplifier 40 is connected at one side via a lead 41 to an electronic programme transmitter (not shown) and at the other side via a lead 42 to a pulse transmitter 43 which can be driven, for example, by means of a V-belt 44 from the hydraulic motor 29 and feeds back the actual value of the position at any time of the two guide beams 2, 3 along the spindles 20, 21. The hydraulic motor 29 and the pulse transmitter 43 are arranged on a bracket 45 attached to the bearer beam 1 as may be seen in FIG. 5, so that they follow all of the movements of the bearer beam 1. The supply leads to the hydraulic motor 29 and to the pulse transmitter 43 are made flexible so that the freedom of motion of these components is not impeded.

The electronic programme transmitter has available a pre-programmed desired value transmitter for that relative position of the guide beams 2, 3 which corresponds with the position of these guide beams at removal of crosswires out of the wire guides at E1 and E2. Again, a number of desired value transmitters are provided, which can be programmed for relative positions of the guide beams 2, 3, which may be chosen in order to be able to produce grids having pitches of the crossrods which in case of necessity may be altered at option even during operation.

Moreover two pulse transmitters (not shown) are provided, one of which at any time in the limiting position of the transport beam 1 shown in FIG. 2, emits a pulse by which one of the desired value transmitters for selectable relative positions of the guide beams 2, 3 is energized, whereupon these guide beams get brought into the relative position corresponding with the crosswire pitch desired at that instant. The second pulse transmitter at any time in the limiting position of the bearer beam 1 shown in FIG. 3, emits a pulse by which the pre-programmed desired value transmitter for the relative position of the bearer beam is energized, which then brings the guide beams 2, 3 back into the relative position necessary for the removal of further crosswires out of the wire guides at E1 and E2. The pulses emitted by the two pulse transmitters are fed to a resettable counter and added in it.

With each of the desired value transmitters which can be programmed for selectable relative positions of the guide beams 2, 3 there is associated a step-count transmitter which likewise may be programmed. The number of pulses added up in the resettable counter is compared with the preprogrammed number of steps in the step count transmitter connected to the control loop at the time. As soon as coincidence is reached, the step count transmitter connected to the control loop at the time and the transmitter associated with it for selectable relative positions of the guide beams 2, 3 get switched off from the control loop and the next step count transmitter with the transmitter associated with it for selectable relative positions of the guide beams is connected to the control loop, whereupon at the same time the counter is reset to zero. This construction of the programme transmitter makes it possible to arrange within one and the same grid run selectable numbers of crosswires at selectable pitches.

From the electronic programme transmitter which has just been described a signal goes via a lead 41 to the servo-amplifier 40, corresponding with a certain desired relative position of the guide beams 2, 3. The servo-amplifier 41 now acts upon the electrohydraulic valve 39 and brings it into that switching position by which the hydraulic motor 29 is driven in the sense to bring the position of the guide beams 2, 3 at the time closer to the desired relative position. Simultaneously with the actuation of the hydraulic motor 29 the pulse transmitter 43 sends pulses via the lead 42 to the servo-amplifier 40 which feeds back the changing actual position of the guide beams 2, 3. As soon as the actual value and desired value of the relative position agree, the electrohydraulic valve 39 gets brought into the neutral switching position shown in FIG. 4 and the hydraulic motor remains at rest until the servo-amplifier 40 gets fed a new command signal via the lead 41.

Since modern hydraulic motors reach very high r.p.m., readjustment of the relative positions of the guide beams 2, 3 is easily possible within the short time that the bearer beam 1 needs for arriving from the position shown in FIG. 2 into the position shown in FIG. 3. As may further be seen from FIGS. 4 and 5, the shifting of the guide beams 2, 3 is always effected by equal amounts in opposite directions, whereby the different lengths of stroke $H+x$ and $H-x$ of the transport arms 4, 5 functioning as transfer tools result. It may be mentioned that the same effect could also be achieved in other ways, say, by the employment of pistons acted upon in opposite senses instead of the spindles as shown.

Grids having different crosswire pitches demand an adaptation of the disance apart of the welding electrodes of each double spotwelding stretch to the crosswire pitch at the time. In FIGS. 6 and 7 welding electrodes 50, 51 of a double spotwelding stretch may be seen, with which a passive current bridge 52 on the opposite side of the plane of production of the grid co-operates. FIG. 6 shows the instant at which the transport arms 4, 5 take over the crosswires at the feed lines E1, E2, FIG. 7 the instant of the laying of the crosswires Q1, Q2 on the lower electrodes 50, 51 arranged separated from one another at the crosswire pitch $A+2x$.

The electrodes 50, 51 are connected by means of electrode carriers 53, 54 to busbars 55, 56 which are connected via supply leads 57, 58 to the secondary windings of welding transformers (not shown). In the embodiment illustrated the supply lead 58 passes through the busbar 55 and is electrically insulated with respect to the latter by an insulating layer which is not shown. The busbars 55, 56 are attached to guide plates 59, 60 which engage with a spindle 61 the two halves of which exhibit opposed threads and which is supported immovably with respect to a bearer plate 62 fixed to the machine.

The spindle 61 in a similar way to the spindles 20, 21 in FIGS. 4 and 5 is driven by a hydraulic motor and allows the guide plates 59, 60 supported to be able to slide on the bearer plate 62 and all of the parts connected to these guide plates to shift by equal amounts x in opposite senses. The electronic device which regulates the amount of shift of the welding electrodes is constructed exactly the same as that described in connection with FIGS. 4 and 5.

The servo-amplifier which effects the shifting of the welding electrodes is always connected, when the counter of the electronic programme transmitter gets rest to zero, to the transmitter for selectable relative positions of the guide beams 2, 3 which at this instant is newly connected to the control loop. Adjustment of the electrodes 50, 51 is thereby effected to a spacing corresponding with the desired pitch of the grid crosswires. As soon as the electrodes have adopted the new positions, the connection between the servo-amplifier for the shifting of the welding electrodes and the transmitter for the relative positions of the guide beams gets interrupted again and it remains interrupted until the next resetting of the counter to zero. Only then is the servo-amplifier for the adaptation of the spacing of the electrodes, connected to the next relative position transmitter for the guide beams.

The current bridge 52 which is provided with a replaceable wearing-bar 63 is hinged by means of a hinge 64 and a sprung ram 65 in known manner to an electrode beam 66 which can be moved up and down.

A feed-hook 67 seizes crosswires Q which are already welded to the longitudinal members L of the grid and by engaging with them pulls the grid forwards each time by twice the pitch of the crosswires. The feed-hook may as in itself known, form an integral component of the welding machine and be driven directly by the latter but it may also, as likewise known, belong to a special grid feed mechanism synchronized with the welding machine.

If the crosswires of three succeeding grid meshes have the distances apart A1, A2 and A3, the length of the necessary feed step V by which the hooks 67 must convey the grid onwards, is given by $$V = A2 + \frac{A1 + A3}{2},$$

from which in the case of equal crosswire pitch A the feed step V=2A results.

If grids having relative large meshes have to be produced, in which the individual sizes of mesh within the grid do not differ from one another all that much, the electrode system shown in FIG. 8 having immovably fixed electrodes may be used. As may be seen from FIG. 8, each electrode consists of one narrow electrode body 70, 71 running in parallel with the longitudinal member L of the grid and having a height which decreases outwards in the directions away from the plane of symmetry MS of the lines of weld, and upon which a replaceable wearing-bar 72 and 73 respectively is provided. As may further be seen from FIG. 9 illustrating the welding zone of an electrode enlarged, in the case of this arrangement it is always only the crosswire Q1, lying nearest to the plane of symmetry of the lines of weld, which can come into contact with the electrodes, whereas the remaining crosswires Q2, Q3 which indeed are still lying in the electrode zone, remain above the electrodes and at a distance from them. A shortcircuit of the welding stretches by these crosswires is therefore impossible and the crosswire pitches may by this simple device be altered within limits without adjustable electrodes such as have been shown in FIGS. 6 and 7 being necessary.

A particularly simple electrode system which does not, however, allow of any alteration of the crosswire pitches during the current production of a grid, is shown in FIG. 10. In the case of this embodiment electrode bars 70, 71 are arranged again on the electrode holders 53, 54, running in parallel with the longitudinal members L of the grid. The actual welding electrodes 74, 75 are fitted onto the electrode bars so that they may be replaced, adjusted and fixed.

Figure 12:
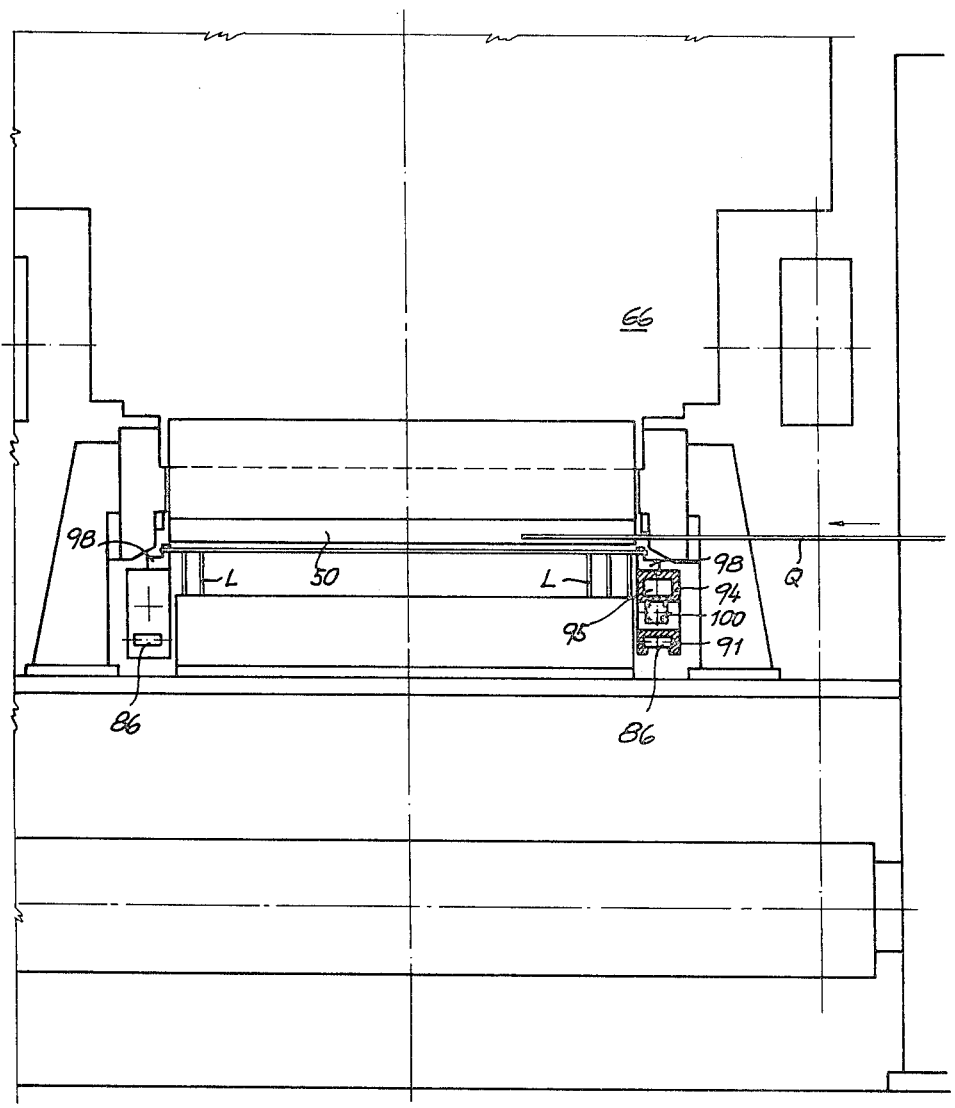
Figure 11:
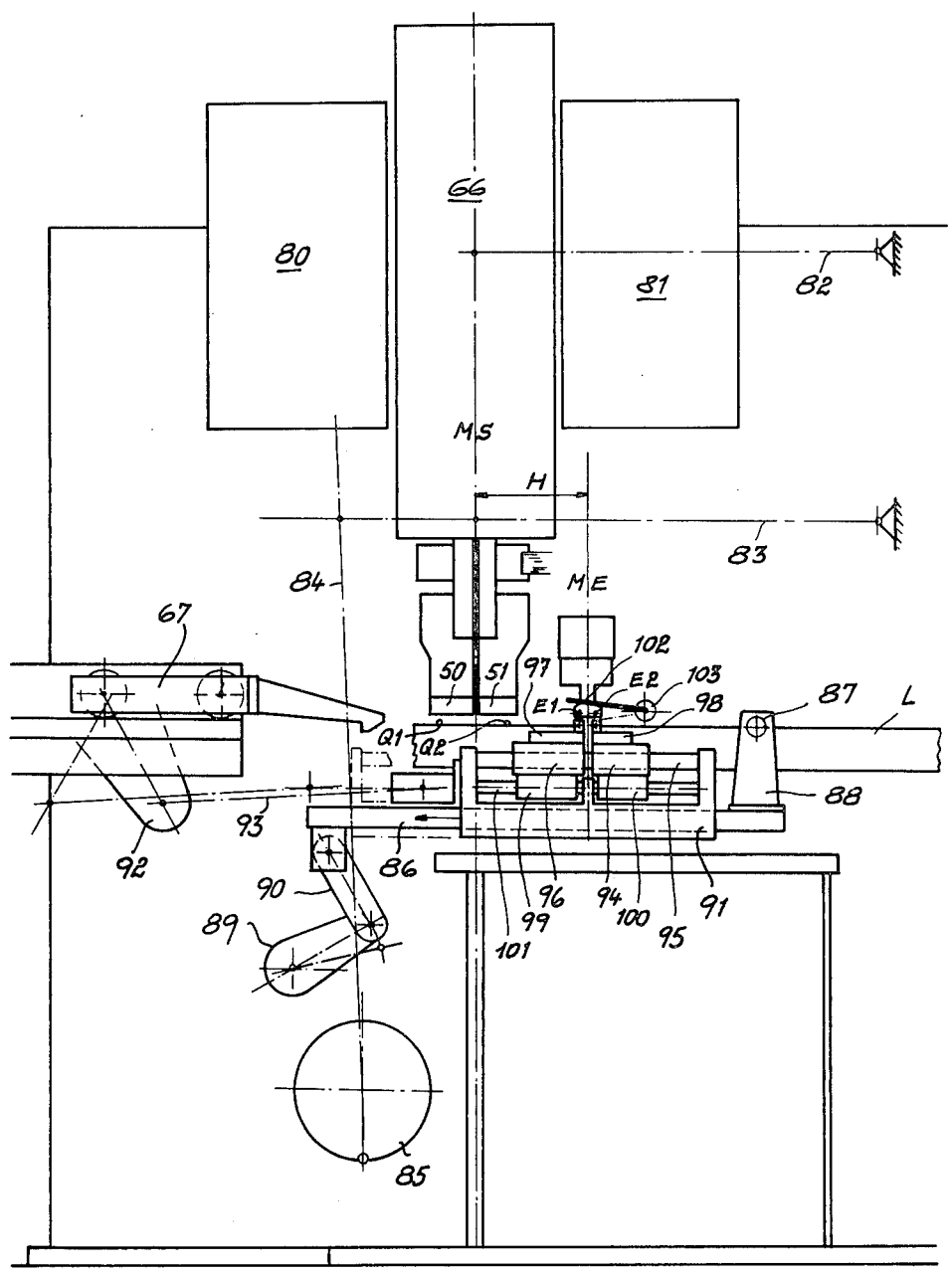
FIG. 11 shows a second embodiment of a machine in accordance with the invention in side elevation; and, FIG. 12 is a front elevation corresponding to FIG. 11.

A machine which is intended for the production of gratings from tall but narrow striplike longitudinal members L, into the narrow faces of which crossrods Q1, Q2 . . . are to be welded in until their uppermost generatrices lie in the same plane as the uppermost generatrices of the longitudinal members L, is shown diagrammatically in FIGS. 11 and 12.

The welding transformers 80, 81 are, in the case of this machine, arranged on opposite sides of the electrode beam 66 and fastened to it so that they are capable of contributing by their great weight to the generation of the quite considerable welding pressure in this case. The electrode beam 66 is in turn hinged to two parallel links 82, 83, the link 83 being connected by means of a connecting rod 84 to a crank 85. By means of this arrangement the electrode beam 66 may be moved up and down by the necessary amount.

The welding electrodes 50, 51 are likewise arranged above the plane of production of the grid and a special current bridge is not necessary because the longitudinal members L of the grid with their comparatively very large cross-sectional area can take over the conduction of the current between two adjacent crosswires Q1, Q2 fed from electrodes of opposite polarity, without heating occuring which is disadvantageous to the longitudinal members.

A sliding guide 86 is hinged onto the machine housing by means of a connector-piece 88 supported pivotally in a hinge 87. By means of a rocking arm 89 and a link 90 the sliding guide 86 may be tilted about the hinge 87. A carriage 91 supported to be able to slide along the sliding guide 86 may be slid along the sliding guide 86 by a rocking arm 92 in cooperation with a pushrod 93. Two further carriages 94 and 96 are supported to be able to slide along a second sliding guide 95 which is connected rigidly to the carriage 91. The two carriages 94, 96 carry one crosswire transfer tool 97, 98 each, and are connected rigidly to two pistons 99, 100 which are guided to be able to slide along a piston rod 101 stationary in the carriage 91. The crosswires are shot into the wire guides at E1, E2 closed by sprung flaps and then by means of crosswire transfer tool levers 102 are delivered out of the wire guides against the action of the spring force into receiver openings or respectively notches in the crosswire transfer tools 97, 98. For this purpose the crosswire transfer tool levers 102 are fitted onto a rocking shaft 103 which may be actuated at the working rhythm of the welding machine.

Since in the case of machines for the production of gratings the crosswires have relatively large diameters in relation to their length and are therefore so stiff that they do not need any support in the region of the longitudinal members L of the grating which is to be produced, in the case of machines of that kind crosswire transfer tool members are necessary and provided merely at the two sides of the welding zone.

As soon as two crosswires have arrived in the receiver openings or respectively the notches in the crosswire transfer tools 97, 98, the carriage 91 moves along the sliding guide 86 lying in parallel with the longitudinal members L under the driving action of the rocking arm 92 and the pushrod 93, by the amount H from the wire guides at E1 and E2 towards the welding electrode system.

Upon this movement relative movements of the carriages 94, 96 in opposite senses by the amount x with respect to the carriage 91 are superimposed by the pistons 99, 100 being acted upon by pressure medium in the required direction and therefore moving along the piston rod 101, taking with them the carriages 94, 96 which move along the sliding guide 95. The control elements necessary for the generation of these relative movements are the same as have already been described in connection with FIGS. 4 and 5.

As soon as the two newly shot-in crosswires have arrived in the positions Q1 and Q2 in FIG. 11, the rocking arm 89 is tilted into the position indicated in dash-dot line in FIG. 11. The sliding guide 86 is also thereby tilted about the hinge 87 and adopts a position running at an acute angle to the longitudinal members L, whereupon the crosswires get laid onto the longitudinal members in the positions Q1 and Q2 and then get fixed onto them in their position by the electrodes 50, 51 which together with the electrode beam 66 are lowered under the action of the crank 85.

After the welding the rocking arm 92 and with it the carriage 91 returns into the starting position. Since during this motion the carriage 91 is shifted along the still sloping sliding guide 86, the crosswire transfer tools remain during this phase of the motion out of engagement with the crosswires. At the same time the two carriages 94, 96 also return to their starting positions, sliding along their sliding guide 95 under the action of the pistons 99, 100.

As soon as the carriages 91 94 and 96 have reached their starting positions, the sliding guide 86 gets tilted again into the position in parallel with the longitudinal members L, whereupon all of the parts lie ready for picking up further crosswires.

The welding processes themselves in the case of all of the embodiments are effected in known manner, in doing which both a.c. and also d.c. welding may be applied. The machines described are suitable for the welding of grids from wires over a very wide range of diameters, say, between 1 to 14 mm, as also for the production of the gratings mentioned in the last embodiment, having striplike longitudinal members standing on edge.

We claim:

1. A multispotwelding machine for the production of grids or gratings of longitudinal members and crosswires crossing said longitudinal members, said machine having a welding electrode system suitable for making double spotwelds at two longitudinally variably spaced weld lines where two of said crosswires cross said longitudinal members, two wire-guides arranged at a fixed distance apart on feed lines for the simultaneous feeding in of two of said crosswires, crosswire transfer tools arranged on a common bearer, means for shifting said bearer by a stroke corresponding with a distance of the plane of symmetry midway between said feed lines from the plane of symmetry midway between said lines of weld, and means for the forward feed of said grid or grating after each welding operation, including two of said crosswire transfer tools each for transferring one of said crosswires from a respective one of said feed lines to a corresponding one of said weld lines, and means are provided for shifting said tools on said bearer in opposite senses so the strokes of said tools are greater and smaller by equal amounts than that of said bearer.

2. A welding machine as in claim 1, wherein supports for said tools are supported and shiftable along guides on said common bearer and mechanisms are provided for shifting said supports in opposite senses along said guides.

3. A welding machine as in claim 2, wherein said mechanisms comprise screw spindle drives having opposed threads.

4. A welding machine according to claim 2, wherein said mechanisms comprise fluid operated piston/cylinder units.

5. A welding machine as in claim 1, wherein means are provided for swinging said two tools and said bearer at the start of their working strokes towards said feed lines and at the end of their said working strokes away from the plane of production of said grid or grating.

6. A welding machine as in claim 1, wherein said tools are formed by transport-arms running in the longitudinal direction of said machine, said transport-arms projecting in the same direction from said bearer and having at their free ends notches for picking up said crosswires.

7. A welding machine as in claim 1, wherein said welding electrode system has pairs of electrodes fixed in positions offset from one another in the longitudinal direction of said machine and having effective welding faces sloping in said longitudinal direction in opposite senses like a roof.

8. A welding machine as in claim 7, wherein said welding faces are formed of wearing-strips.

9. A welding machine as in claim 1, wherein said welding electrode system has pairs of electrodes which are adjustable along electrode bars arranged one behind the other upon electrode holders in the longitudinal direction of said machine.

10. A welding machine as in claim 1, wherein said welding electrode system has pairs of electrodes offset from one another in the longitudinal direction of said machine, and mechanisms provided for the adjustment of the two electrodes of each of said electrode pairs in opposite senses in conformity with the alteration of the lengths of stroke of said two crosswire transfer tools in opposite senses.

11. A welding machine as in claim 10, wherein said electrode adjustment mechanisms are screw spindle drives having opposed threads.

12. A welding machine as in claim 1, wherein pulses for the desired values of the crosswire pitches are provided and, during operation of said machine, are adapted to be switched on by a programme control before each working cycle to control, via a control loop and a servomotor, mechanisms for alternating the lengths of stroke of said two transfer tools in opposite senses and, if necessary, mechanisms for adjustment to the two electrodes of each electrode pair of said electrode system in opposite senses.

* * * * *